(12) United States Patent
Ku et al.

(10) Patent No.: US 10,819,139 B2
(45) Date of Patent: Oct. 27, 2020

(54) POWER SUPPLY INCLUDING LOGIC CIRCUIT

(71) Applicant: HEWLETT PACKARD ENTERPRISE DEVELOPMENT LP, Houston, TX (US)

(72) Inventors: Chung-Ping Ku, Taipei (TW); Po-Wen Hsueh, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 438 days.

(21) Appl. No.: 15/280,884

(22) Filed: Sep. 29, 2016

(65) Prior Publication Data

US 2018/0090984 A1   Mar. 29, 2018

(51) Int. Cl.
| H02J 9/06 | (2006.01) |
| H02M 7/04 | (2006.01) |
| H02M 3/04 | (2006.01) |
| H02J 1/10 | (2006.01) |

(52) U.S. Cl.
CPC ............ *H02J 9/061* (2013.01); *H02J 1/10* (2013.01); *H02J 9/06* (2013.01); *H02M 3/04* (2013.01); *H02M 7/04* (2013.01)

(58) Field of Classification Search
CPC .... H02J 1/10; H02J 2001/106; Y10T 307/587
See application file for complete search history.

(56) References Cited

U.S. PATENT DOCUMENTS

| 9,035,626 | B2 | 5/2015 | Stratakos et al. | |
| 2006/0253719 | A1 | 11/2006 | Tam et al. | |
| 2012/0043823 | A1 | 2/2012 | Stratakos et al. | |
| 2012/0086276 | A1* | 4/2012 | Sawyers | H02J 1/12 |
| | | | | 307/66 |
| 2014/0095897 | A1 | 4/2014 | Ji et al. | |
| 2015/0067364 | A1 | 3/2015 | Nakazawa | |
| 2015/0076902 | A1 | 3/2015 | Zou et al. | |

FOREIGN PATENT DOCUMENTS

| CN | 103154851 A | 6/2013 |
| CN | 105027404 A | 11/2015 |
| CN | 105119330 A | 12/2015 |
| EP | 2804304 | 11/2014 |
| EP | 2955828 A1 | 12/2015 |
| EP | 3301772 A1 | 4/2018 |

OTHER PUBLICATIONS

Texas Instruments Incorporated, "Turbo-Boost Charger Supports CPU Turbo Mode," SLYT448, Analog Applications Journal, 2012, pp. 5-7, available at http://www.ti.com/aaj.

* cited by examiner

*Primary Examiner* — Daniel Kessie
(74) *Attorney, Agent, or Firm* — Hewlett Packard Enterprise Patent Department

(57) ABSTRACT

A power supply includes a power converter and a battery. A logic circuit controls division of output of power, between the power converter and the battery, to an output of the power supply.

9 Claims, 8 Drawing Sheets

POWER SUPPLY INCLUDING LOGIC CIRCUIT

BACKGROUND

Computing devices, such as but not limited to servers, include a power supply which converts alternating current (AC) mains power to direct current (DC) power. The power supply may also include a battery which acts as a back up to provide DC power in the event of a mains power failure.

BRIEF DESCRIPTION OF THE DRAWINGS

Examples of the present disclosure will now be described, by way of non-limiting example only, with reference to the accompanying drawings, in which.

DETAILED DESCRIPTION

Figure 1:
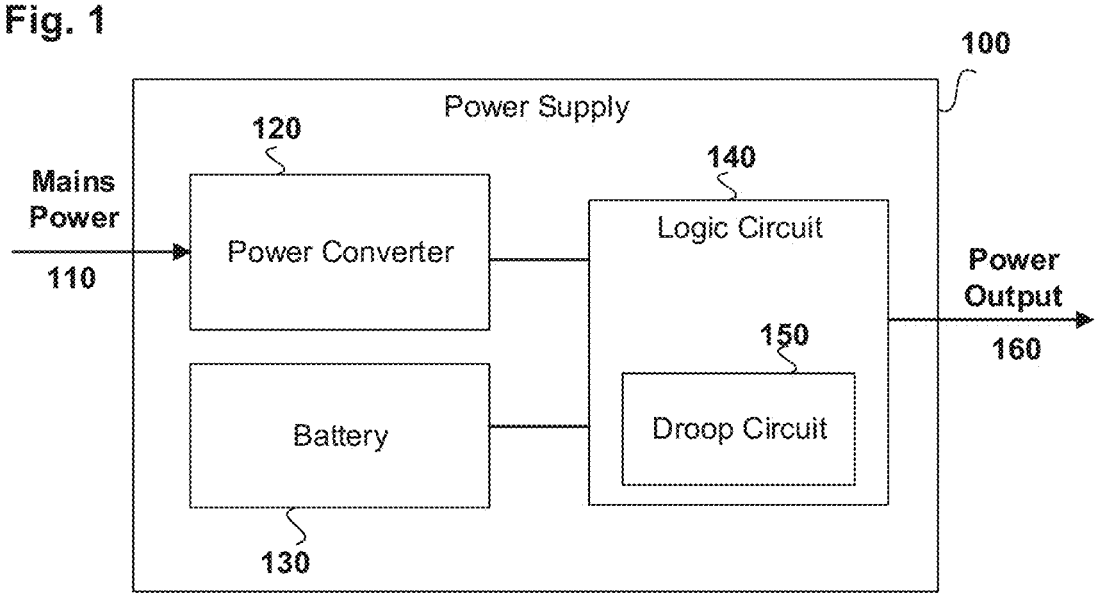
FIG. 1 is a schematic diagram of an example power supply according to the present disclosure.

FIG. 1 shows an example of a power supply 100 according to the present disclosure. The power supply may be used to supply electrical power to an enterprise computing device, such as server, storage system, network switch etc.

The power supply 100 has an input 110 through which it receives mains electrical power in the form of alternating current (AC). The power supply has an output 160 through which it supplies electrical power in the form of direct current (DC) to a computing device. The power supply 100 includes a power converter 120 and a battery 130. The power converter 120 may be an AC to DC converter for converting mains AC power to DC power which is usable by the computing device. The power converter may for example include a rectifier to convert AC voltage to DC voltage. The power converter may also include a filter to smooth the DC voltage and/or a transformer to transform a relatively high input AC voltage to a lower AC voltage before it is converted to DC.

The battery 130 may be a battery that is capable of producing power in place of the power converter for a period of time. The battery may be used to provide power to the output of the power supply in the event that no power is available from the power converter; for instance if there is a mains power failure, or a failure of the power converter. The battery may thus act as a source of backup power.

The power supply may have a power rating which is a predetermined threshold for maximum advisable electrical power to be supplied by the power supply in normal conditions. The power rating may be a maximum power which can be safely and reliably delivered by the power converter 120 in normal conditions over a prolonged period of time. The power rating of the power supply may also be referred to as the power rating of the power converter, as it is based on the power rating of the power converter. For instance, merely by way of example, if under normal conditions a server requires 800 W or less to operate, then it may be used with a power supply having a power rating of 800 W (i.e. the power converter of the power supply may have a rating of 800 W). However, in some circumstances a greater amount of power may temporarily be demanded from the power supply; this is known as an overload condition and any power supplied above the maximum threshold is known as overload power. For instance, if a central processing unit (CPU) of the server enters turbo mode in which it overclocks or runs faster than normal, then it may temporarily demand more power. Merely by way of example, the server may demand 1200 W placing the power supply in an overload condition.

One way to ensure that the power supply can satisfy this heightened demand for power, in turbo mode, is to use a power converter which has a higher power rating than the power required by the server in normal conditions. For instance if the power supply is provided with a power converter having a rating of 1200 W, then it will easily be able to satisfy the higher demand for power. However, using a higher rated power converter may significantly increase the cost of the power supply. Peaks in demand for power, due to turbo mode of a CPU or otherwise, typically last for just a short duration of time, for instance less than a minute. Therefore a power converter 120 having a rating sufficient to satisfy normal operation of the server, such as 800 W, may be able to temporarily provide a larger amount of power for a short period of time. For example, the voltage output by the power converter may be maintained at a set maximum level, while the current output is increased. However, this is not without risk and puts strain on the power converter and the power supply.

Accordingly, the present disclosure proposes that at least a portion of the overload power is provided by the battery 130. Overload power is that portion of the power which is above the power rating of the power supply. For example, if the power rating of the power supply is 800 W and the demand for power in an overload condition is 1200 W, then the extra 400 W may be provided by the battery. In another example, part of the overload power may be supplied by the power converter 120 and part of the overload power may be supplied by the battery 130. For instance, the power converter may supply its normal 800 W plus an extra 200 W to make a total of 1000 W, while the battery supplies the balance of 200 W to reach the total demanded power of 1200 W. Thus it can be seen from these examples that in overload mode, both the power converter 120 and the battery 130 simultaneously supply power to the output 160 of the power supply.

Provision of power in the overload condition is controlled by a logic circuit 140. The logic circuit 140 determines the portion of power supplied by the power converter and the portion of power supplied by the battery. The logic circuit 140 thus causes both the battery and the power converter to provide DC to the power supply output in response to detecting a demand for power over a predetermined threshold, such as a maximum power rating of the power supply.

The logic circuit may include a droop circuit to control a division of output of power between the power converter and the battery. A droop circuit is a circuit which adjusts the output voltage and/or current of the power converter or the battery. In this way the droop circuit is able to control a relative division of output power between the battery and power converter and also to reduce voltage spikes or transients when the load increases. For example, the droop circuit may cause the output voltage to decrease as output current increases. The droop circuit may adjust the output voltage by changing the effective output impedance of the power converter or the battery. For example, if the power converter is supposed to supply 12V, but supplies 11.9V, that may be considered to be a 0.1V loss caused by internal impedance of the power converter. The effective output impedance is a nominal impedance that would cause the drop in voltage. The term effective output impedance is to be interpreted broadly as including both a drop in voltage caused by an actual impedance, such as a resistance, and a drop in voltage due to a feedback circuit etc. The drop in voltage caused by a droop circuit is known as voltage droop, while the effective output impedance created by a droop circuit may be referred to as the droop impedance. If the droop circuit is associated with the power converter, then the action of the droop circuit may be referred to as injecting a droop impedance to the output of the power converter. If the droop circuit is associated with the battery, then the action of the droop circuit may be referred to as injecting a droop impedance to the output of the battery.

Figure 2:
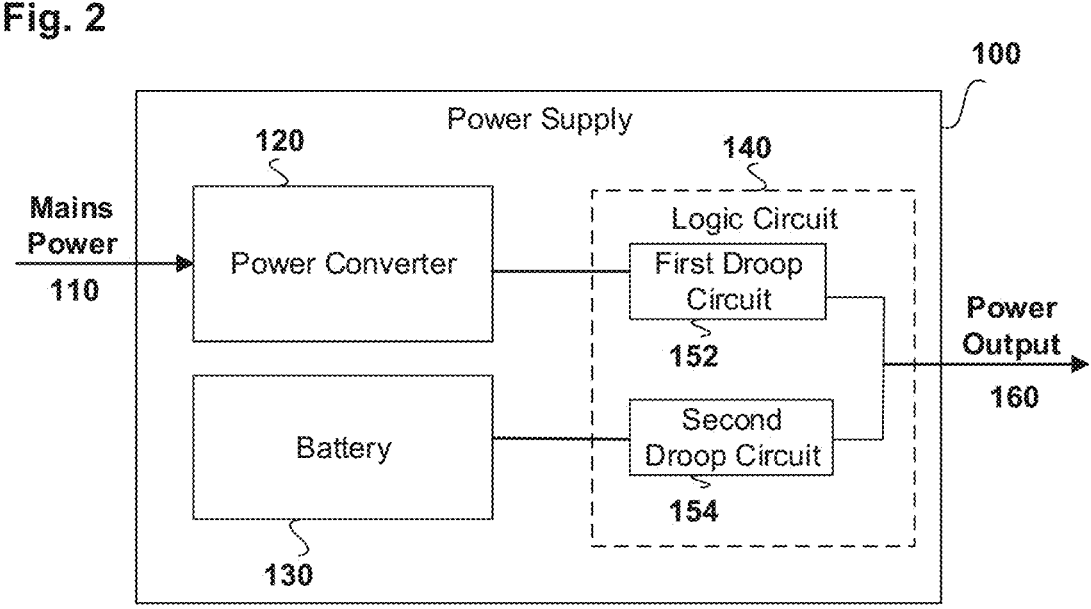
FIG. 2 is a schematic diagram of another example power supply according to the present disclosure.

FIG. 2 is a more detailed example of a power supply according to the present disclosure, in which the logic circuit 140 includes a first droop circuit 152 and a second droop circuit 154. The first droop circuit 152 is associated with the power converter 120, meaning that is connected to and regulates a power output of the power converter in an overload condition of the power supply. The droop circuit may regulate the power output of the power converter by decreasing a voltage output by the power converter, when a current output by the power converter increases. Note that while shown externally for clarity in the figures, the first droop circuit 152 may be embedded in a control circuit of the power converter 120. The second droop circuit 154 is associated with the battery 130, meaning that it is connected to and regulates a power output of the battery. The second droop circuit may regulate the power output by the battery in the overload condition by decreasing a voltage output by the battery when a current output by the battery increases. In one example the second droop circuit may be integrated into a DC-DC converter unit of the battery which takes an output from the battery and converts the voltage to a desired level.

To achieve the regulation, the first droop circuit 152 may adjust the effective output impedance of the power converter, while the second droop circuit 154 may adjust the output impedance of the battery. The effective output impedance of the battery may, in one example, be an effective output impedance of a DC to DC converter associated with the battery or an output impedance of another unit between an output of the battery and the output of the power supply. The relative levels of droop impedance of the first droop circuit 152 and the second droop circuit 154 control the relative portions of overload power supplied by the power converter 120 and the battery 130. The logic circuit may determine the droop impedance of each droop circuit 152, 154 based on predetermined settings of the power supply and/or based on monitoring a power demanded by a load connected to the power supply output, and the power output by the power converter and/or the battery.

Figure 3:
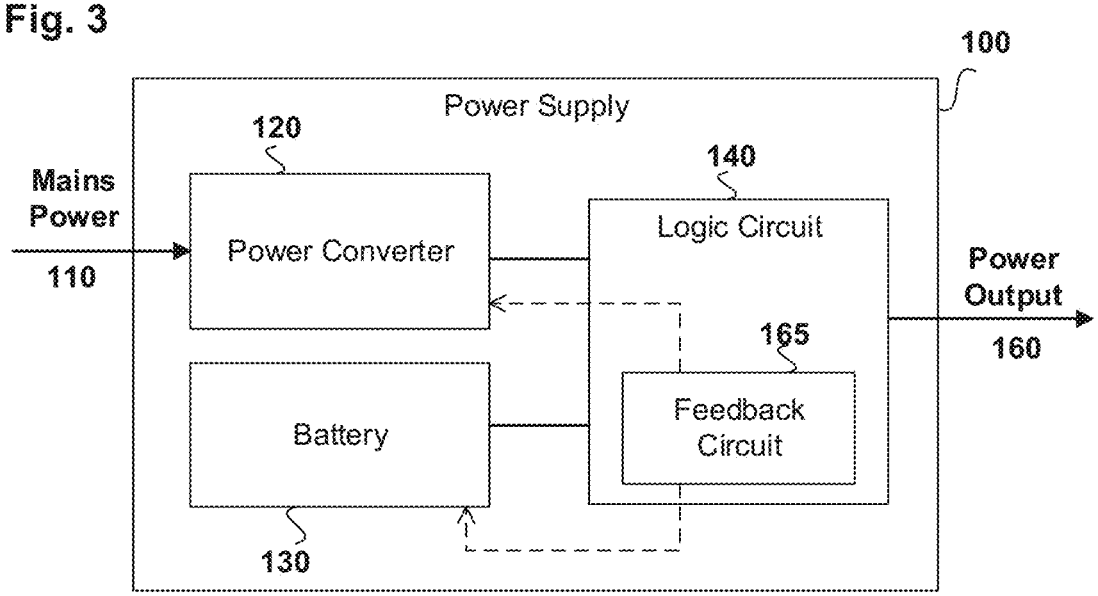
FIG. 3 is a schematic diagram of another example power supply according to the present disclosure.

FIG. 3 shows another example of a power supply according to the present disclosure, in which the logic circuit 140 includes a feedback circuit 165. The feedback circuit 165 monitors the power provided by each of the battery and the power supply and controls the way in which provision of power to the output of the power supply is divided between the battery and the power converter. For example, in an overload condition of the power supply, the feedback circuit 165 may cause all of the overload power, above the predetermined threshold of the power supply, to be supplied by the battery, or may cause the overload power to be provided by both the battery and the power supply. In one example, the feedback circuit causes the overload power to be substantially equally split between the battery and the power converter. In another example, the feedback circuit causes the overload power to be split between the battery and the power converter in a ratio other than 50/50, for instance 55/45 or 60/40 etc.

The feedback circuit may control the output of power by the power converter and the battery by sending a feedback signal to the power converter and the battery, or to control circuits thereof. In one example, the feedback circuit 165 controls the division of power by adjusting a droop impedance of a droop circuit associated with the power converter or the battery, in response to detecting a demand for overload power exceeding a maximum power rating of the power supply.

Figure 4:
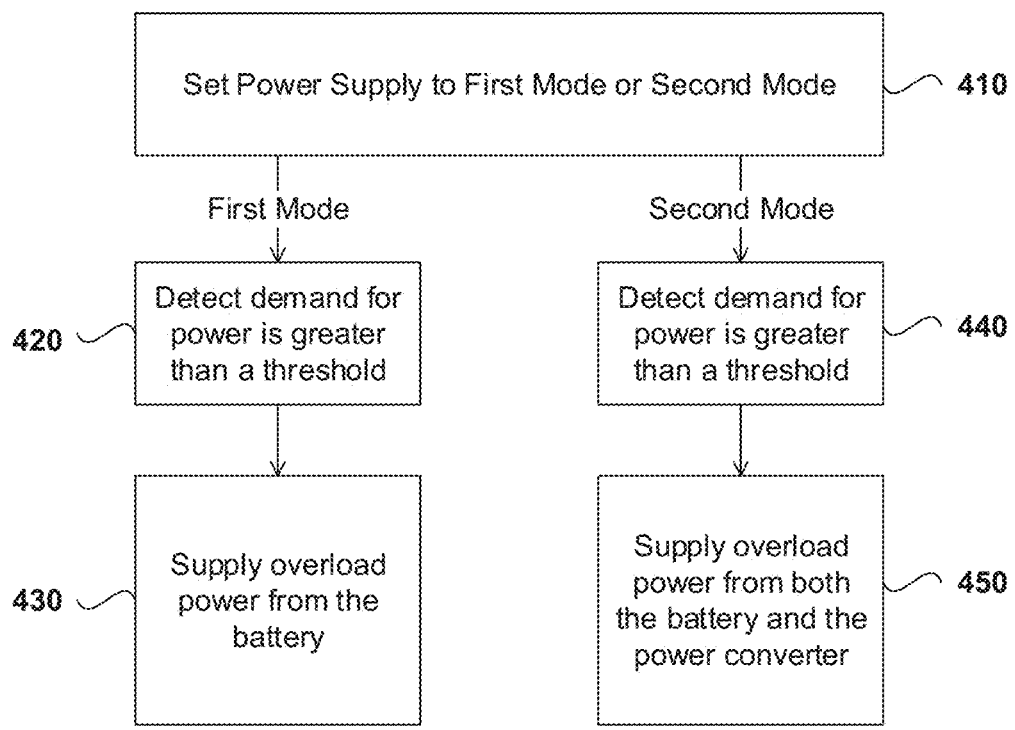
FIG. 4 is a flow diagram showing an example method of operation of a power supply according to the present disclosure.

FIG. 4 shows an example method of operation of a power supply according to the present disclosure. The method may be performed by a logic circuit of the power supply for example.

At block 410 the power supply is set to a first mode or a second mode. This may be done by a user of the power supply flipping a switch of the power supply, using a control panel of the power supply, or sending a remote operating instruction to the power supply. In this context the user may be a human user, a computer device or management system etc. The first mode may be a "battery mode" in which overload power is to be supplied by the battery alone, while the second mode may be a "performance mode" in which overload power is to be supplied by both the battery and the power converter.

If the power supply is set to the first mode then the method proceeds to block 420. If the power supply is set to the second mode then the method proceeds to block 440.

At block 420 the demand for power from the supply is detected and if it is determined that the demand for power exceeds a threshold, such as a maximum power rating of the power supply, then the method proceeds to block 430.

At block 430 the overload power, which is the difference between the demanded power and the threshold, is supplied by the battery.

At block 440 the demand for power from the supply is detected and if it is determined that the demand for power exceeds a threshold, such as a maximum power rating of the power supply, then the method proceeds to block 450.

At block 450 the overload power, which is the difference between the demanded power and the threshold, is supplied by both the battery and the power converter. In one example there is a substantially even split of the overload power between the battery and the power converter. In another example the logic circuit of the power supply may be arranged to cause a non-equal split of overload power between the battery and the power converter according to settings of the power supply, e.g. a 60/40 or 70/30 split or vice versa.

FIGS. 5A to 5D show examples of how the voltage and current output by a power converter 120 of a power supply 100 according to the present disclosure may vary, under the control of a logic circuit 140. The figures are graphs in which the y-axis represents the voltage Vpc which is output by the power converter, while the x-axis represents the total current Iout which is output by the power supply.

The output current Iout is expressed as a percentage of the output current when the power supply is operating at 100% of its maximum power rating under normal conditions. E.g. for an 800 W power supply, this will be the current output by the power converter when a load demands 800 W from the power supply and the power is supplied entirely by the power converter and not the battery. The variation in voltage is exaggerated in the diagrams for emphasis and clarity, so in general the percentage of normal maximum output current Iout from 0% to 150% may be taken to correspond to the load on the power supply from 0% to 150% of normal maximum load. That is at 150% load the power supply delivers 150% of its normal maximum power rating in electrical power to the load.

The region of the graphs from 0% to 100% of the maximum Iout is shown as a shaded region with vertical lines to emphasize that it corresponds to normal conditions of the power supply. The region of the graphs from 100% to 150% of the maximum Iout corresponds to an overload condition of the power supply and is shaded with dashed horizontal lines.

Figure 5A:
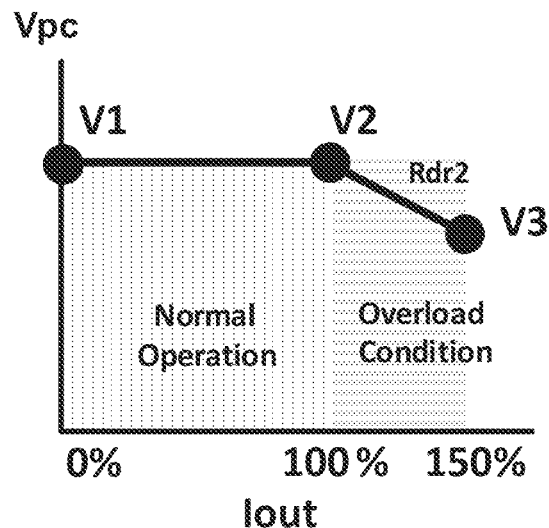
FIGS. 5A to 5D are graphs showing power converter output voltage in relation to power supply output current for example power supplies according to the present disclosure.

In the example of FIG. 5A, the output voltage of the power converter is held substantially constant during normal operation of the power supply. So the voltage V1 at 0% of maximum current output is equal to the voltage V2 at 100% of maximum current output. Thus regardless the load, the output voltage remains substantially stable in the normal operating conditions. This may be achieved by regulation of the output voltage and for instance by not injecting a droop impedance to the output of the power converter. E.g. any droop circuit associated with the power converter may be controlled so that it has substantially zero impedance.

However, in the overload condition, the voltage is gradually reduced from V2 at 100% of current output to V3 at 150% of normal maximum current output. This voltage slope between V2 and V3 is known as the droop slope and may be achieved by injecting a droop impedance $R_{dr2}$ between the output of the power converter and the output of the power supply. This droop impedance may act as if it were an internal impedance of the power converter. Mathematically the droop impedance $R_{dr2}$ injected to the power converter output when the power supply is in the overload condition may be expressed as $$R_{dr2}=(V2-V3)/(I_{out\_150\%}-I_{out\_100\%})$$ [Equation 1]

Where V2 and V3 have been defined above, $I_{out\_150\%}$ is the output current at 150% of maximum load and $I_{out\_150\%}$ is the output current at 100% of normal maximum output load.

The voltage drop between V2 and V3 is known as 'voltage droop' and may be caused by injecting a droop impedance, or by another feedback or control mechanism. This voltage droop may help to prevent a large voltage transient, i.e. a sharp momentary drop in the voltage output, in the event that the load is increased suddenly. Further, as droop impedance is injected to the output of the power converter, this drop may be compensated by increased power output from the battery.

Figure 5B:
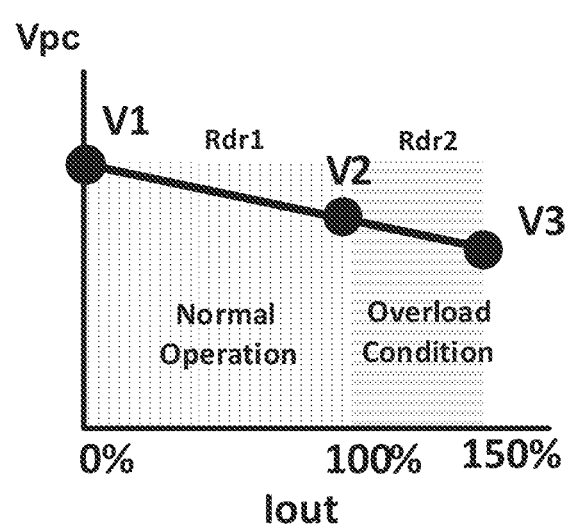

FIG. 5B shows an example similar to FIG. 5A, except that there is voltage droop in both the normal operation mode and the overload condition. In this example, V2 is less than V1, so the voltage output by the power converter reduces as the output current of the power supply increases from 0 output current to 100% of normal output current. In one example, this is achieved by injecting a droop impedance $R_{dr1}$ to the output of the power converter during normal operation. Mathematically, $R_{dr1}$ may be defined as:

$$R_{dr1}=(V1-V2)I_{out\_100\%}$$ [Equation 2]

Furthermore in FIG. 5B, the same as in FIG. 5A, the voltage droops between V2 and V3 in the overload condition as Iout is increased to 150% of the normal output. This may for example be achieved by injecting a second droop impedance $R_{dr2}$ which is defined above.

The droop impedance $R_{dr1}$ injected in normal operation and the droop impedance $R_{dr2}$ injected in the overload condition may be set by the logic circuit, based on settings and configurations of the power supply. Such settings may be stored in non-volatile memory in firmware of the power supply and may for example be set by the manufacturer, a system administrator or computer management system etc. The logic circuit 140 may include logic to switch the droop impedance, of a droop circuit associated with the output of the power converter, from 0 (in the case of FIG. 5A) or $R_{dr1}$ (in the case of FIG. 5B) to $R_{dr2}$, in response to detecting a load on the power supply which demands an overload power which is above a predetermined threshold such as the power rating of the power supply (i.e. a demand for more than 100% of the normal maximum output power). It is to be understood that the droop impedance $R_{dr2}$ injected to the output of the power converter in the overload condition may be the same, lower or higher than a droop impedance $R_{dr1}$ injected to the output of the power converter in the normal condition.

In the example of FIG. 5B the droop impedance $R_{dr1}$ in normal operation and the droop impedance $R_{dr2}$ in overload condition are such that the gradient of voltage droop between V1 and V2, and the gradient of voltage droop between V2 and V3, are the same. Here, the gradient is defined as the change in output voltage of the power converter per unit change in total current output by the power supply.

Figure 5C:
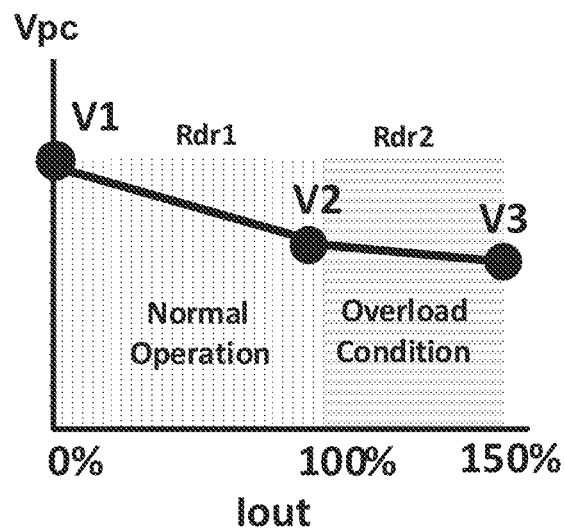
Figure 5D:
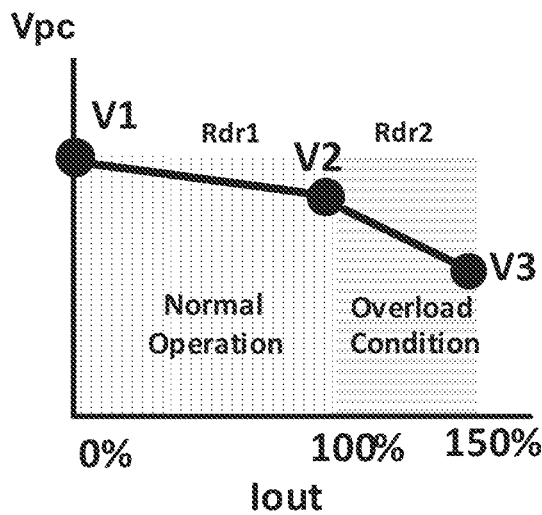

However, the first and second droop impedances may be chosen as any values which can sufficiently smooth out transient voltages and help control the division of output power between the power converter and the battery in a desired fashion. FIG. 5C shows an example in which the first and second droop impedances are set such that the gradient of voltage droop between 0 and 100% Iout is greater than the gradient of voltage droop between 100% and 150% of Iout. Meanwhile, FIG. 5D shows an example in which the first and second droop impedances are set such that the gradient of voltage droop between 0 and 100% Iout is less than the gradient of voltage droop between 100% and 150% of Iout.

The discussion of FIGS. 5A to 5D, above, explained how the logic circuit may vary the output voltage of the power converter. An example, in which this was achieved using a droop circuit between the output of the power converter and the output of the power supply, was also explained. In some examples, a single droop circuit between the output of the power converter and the output of the power supply may be utilized and variation in the output voltage may cause some or all of the overload power in the overload condition to be supplied by the battery. In other examples, there may be a second droop circuit between the output of the battery and the output of the power supply to regulate output power of the battery. In that case the combination of the first droop circuit and second droop circuit and droop impedances injected by the respective droop circuits controls the relative division of output of overload power between the battery and the power converter.

Figure 6A:
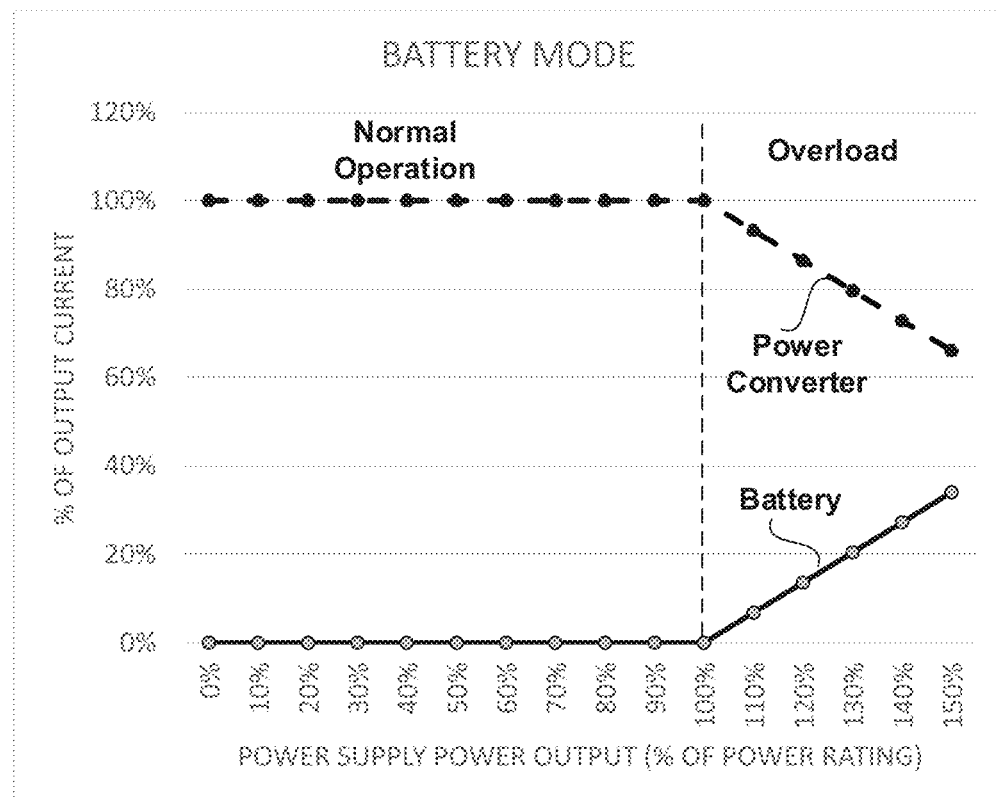
FIGS. 6A and 6B are graphs showing variation of current against power supply power output for an example power supply in a first mode according to the present disclosure.

FIG. 6A is a graph which shows an example of how the relative portion of the total output current of the power supply supplied by the battery and the relative portion provided by the power converter, may vary as the load on the power supply increases from 0% to 150% of the maximum power rating of the power supply.

Figure 6B:
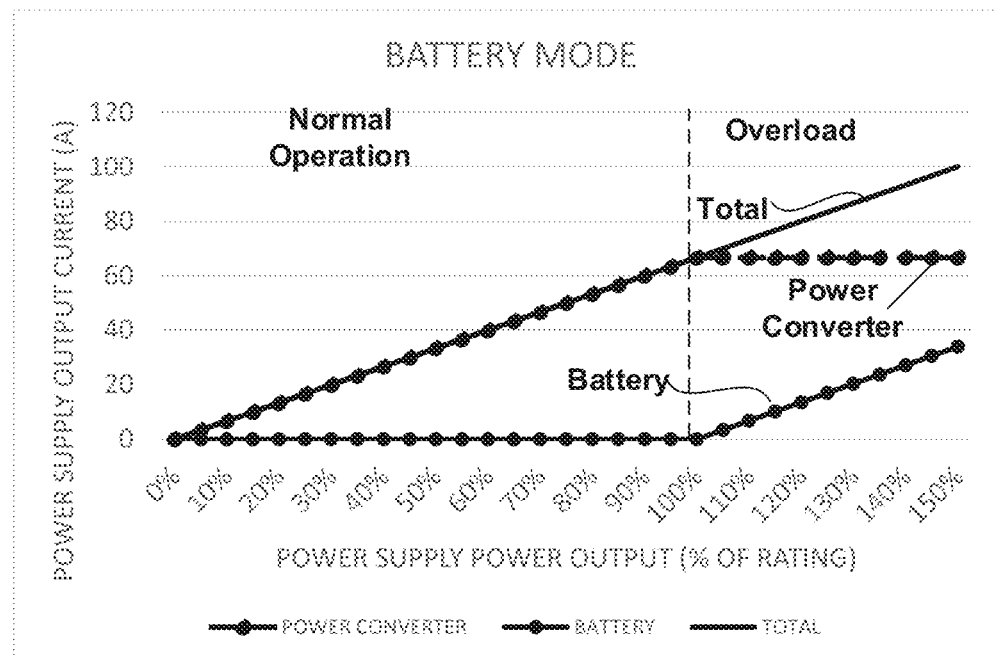

FIG. 6B is a graph which shows an example of the absolute level of current, as measured in Amperes, supplied by each of the battery and the power converter, varies as the load on the power supply increases from 0% to 150% of the maximum power rating of the power supply.

Both FIGS. 6A and 6B correspond to a battery mode of the power supply, referred to as a first mode in FIG. 4, in which during the overload condition, substantially all of the overload power is supplied by the battery. Thus, in FIG. 6A, at loads of between 0 and 100% of the power supply rating, the power converter provides 100% of the current output by the power supply, while the battery provides 0% of the current output by the power supply. However, from loads of 100% to the 150% of the power rating of the power supply, the relative portion of the total output current of the power supply provided by the power converter gradually decreases, while the relative portion of the total output current of the power supply provided by the battery gradually increases. The change may be linear in nature. In the illustrated example, at 150% load the battery supplies approximately 32% of the total output current, while the power converter provides approximately 68% of the total output current. FIG. 6B shows a corresponding example, with absolute values of current, in which the total output current increases from 0 A to approximately 67 A between 0% load and 100% load in normal operating conditions where all of the output current is provided by the power converter. In the overload region from 100% to 150% load, the total current output by the power supply increases to approximately 100%. Further, it can be seen that in the overload region between 100% and 150% load, the current provided by the power converter remains constant at approximately 67 A, while the current provided from the battery increases from 0 A to approximately 33 A.

Figure 7A:
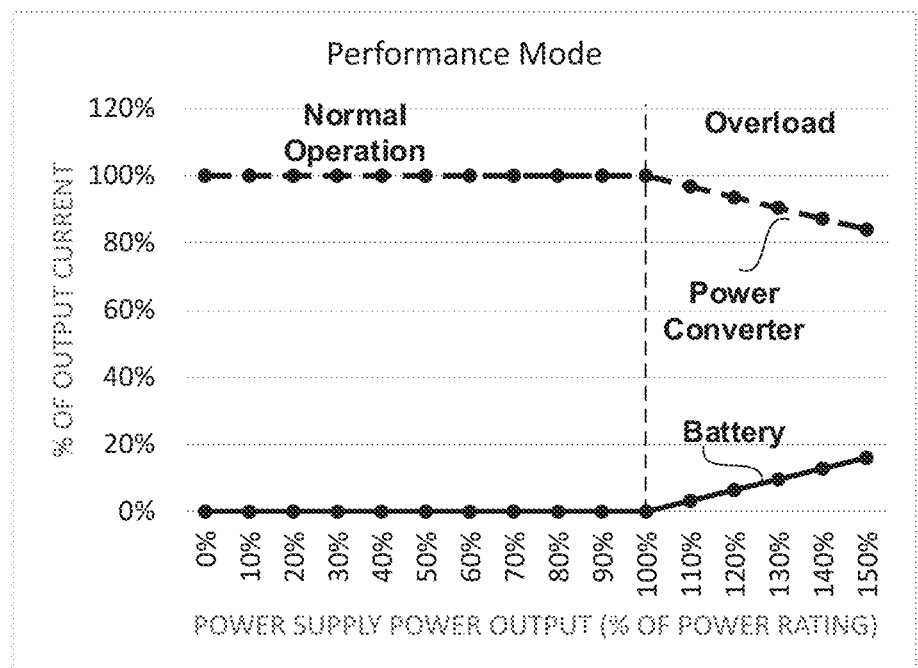
FIGS. 7A and 7B are graphs showing variation of current against power supply power output for an example power supply in a second mode according to the present disclosure.
Figure 7B:
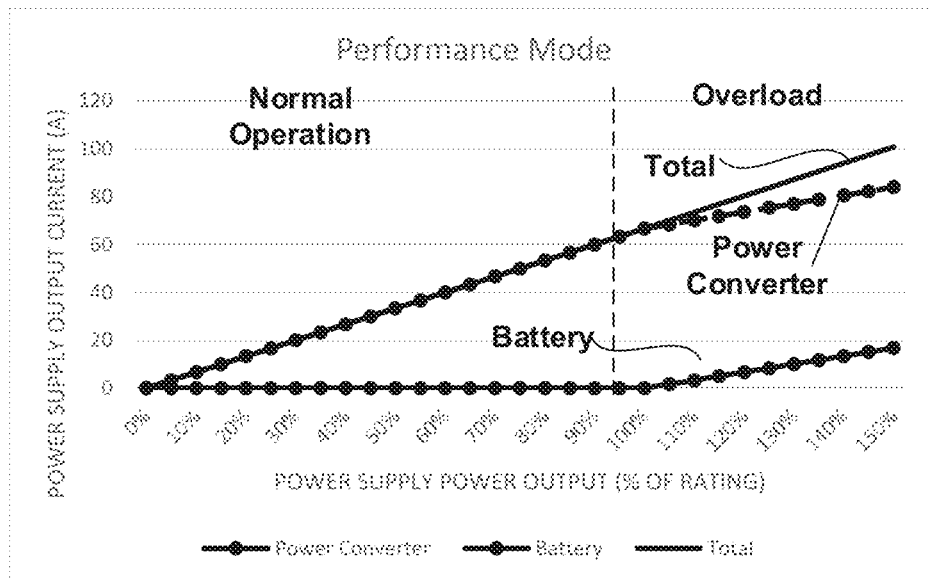

FIGS. 7A and 7B are similar to FIGS. 6A and 6B, but show an example of a 'performance mode' of the power supply, which is referred to as a second mode in the method of FIG. 4. In this second mode, the provision of overload power is shared between the power converter and the battery. Thus, while the operation in normal conditions, is the same as that shown in FIGS. 6A and 6B, in the overload condition between 100% load and 150% load, the proportion of total output current supplied by the power converter reduces from 100% to approximately 84%, while the portion of total output current supplied by the battery increases from 0% to approximately 16%. Meanwhile, the absolute value of current supplied by the battery, in the overload condition of the power supply, from 100% load to 150% load, increases from 0 A to approximately 16 A, while the absolute value of current supplied by the power converter also increases from approximately 67 A to approximately 84 A.

The values and relative percentages in FIGS. 6A to 6D are merely by way of example and should not be taken to restrict the scope of the disclosure. However, the general point is that in the first mode or 'battery mode', the output current from the power converter remains substantially constant in overload conditions, while in the second mode or 'performance mode' the output current from both the battery and the power converter increases as the load increases under the overload conditions.

To assist understanding of the present disclosure and merely by way of non-limiting example, Table 1 below shows example voltage and current outputs from the battery and power converter at 100% load and at 150% load in the battery mode and the performance mode of a power supply.

TABLE 1

| | 0%-100% load | | | 150% load (battery mode) | | | 150% load (performance mode) | | |
|---|---|---|---|---|---|---|---|---|---|
| | Power | Share of Total Load | I | Power | Share of Total Load | I | Power | Share of Total Load | I |
| Power Converter | 800 W | 100% | 0 A to 66.7 A | 800 W | 66.67% | 66.67 A | 1000 W | 83.33% | 83.33 A |
| Battery | 0 | 0 | 0 | 400 W | 33.33% | 33.33 A | 200 W | 16.67% | 16.67 A |
| Total | 800 W | | 0 A to 66.7 A | 1200 W | | 100 A | 1200 W | | 100 A |

As can be seen from the table, at 100% load, which is the same whether in battery mode or performance mode, the power converter delivers 800 W. For instance, the power converter may deliver a steady output voltage of 12V DC and a DC current of approximately 66.7 A at 100% load. At lower loads the output voltage may be the same, while the current may increase from 0 A at 0% load to 66.7 A at 100% load. This example has no, or minimal, voltage droop in the normal operating region of the power converter. However, in other examples, the output voltage at 100% load may be marginally lower than 12V due to voltage droop caused by a droop circuit.

Meanwhile, in the normal operating region, up to 100% load, in both battery mode and performance mode, the battery delivers 0 W of electrical power to the output of the power supply. The battery may for example be disconnected from the output of the power supply such that it delivers zero current and zero power to the output. This is equivalent to a droop circuit of the battery having infinite impedance.

At 150% load, the power supply is delivering power at 150% of its power rating. The division of this overload power between the battery and the power converter differs in the battery mode and the performance mode. The battery mode will be discussed first.

In battery mode, the extra overload power above the maximum power rating, is provided by the battery. Thus, in battery mode, the power converter provides 800 W of electrical power, while the battery provides 400 W of electrical power, to produce a total output power of the power supply of 1200 W. In this example, the logic circuit causes voltage droop of both the battery and the power converter at 150% load of the power supply. Thus, at 150% load, the power converter has an output current of approximately 66.67 A. Thus, compared to the situation at 100% load, the power output of the power converter is substantially the same.

Meanwhile, in battery mode at 150% load of the power supply, the battery provides all of the overload power, which is the difference between the demanded power and the power rating of the power supply. The battery may have a voltage droop and the voltage droop of the battery is not necessarily the same as the voltage droop of the power converter. In this example, the battery outputs approximately 33.33 A at 150% load of the power supply in battery mode.

In contrast, in the performance mode, the provision of the overload power of 400 W is split between both the power converter and the battery. Depending on the configuration of the performance mode, there may be any desired split between the battery and the power supply, but in the illustrated example the provision of overload power is split equally between the two so that the battery supplies 200 W and the power converter supplies 1000 W (the normal 800 W plus an extra 200 W in overload power), to make the total of 1200 W at 150% load.

In the illustrated example, with the equal split of overload power, a droop impedance and voltage droop of a first droop circuit and a second droop circuit, associated respectively with the power converter and the battery, may be the same. This means that the power converter delivers approximately 83.33 A of current and the battery approximately 16.67 A of current.

The voltage droops are typically small, for instance less than 0.1V and so not shown in Table 1 above. However, while the voltage droops may seem small, they may be enough to smooth out voltage transients and to impact the split of output power between the power converter and the battery. This is perhaps best understood in general terms, in context of the droop impedance. If a droop impedance of a first droop circuit associated with the output of the power converter is high compared with a droop impedance of a second droop circuit associated with an output of the battery, then most of overload power will be delivered by the battery, as there is less impedance. On the other hand, if the droop impedance of the first and second droop circuits is substantially equal, then the overload power may be split substantially evenly between the power converter and the battery.

To avoid any doubt, it should be noted that the above powers, currents and voltages are examples only and may vary depending on the implementation, design and power rating of the power supply.

Figure 8:
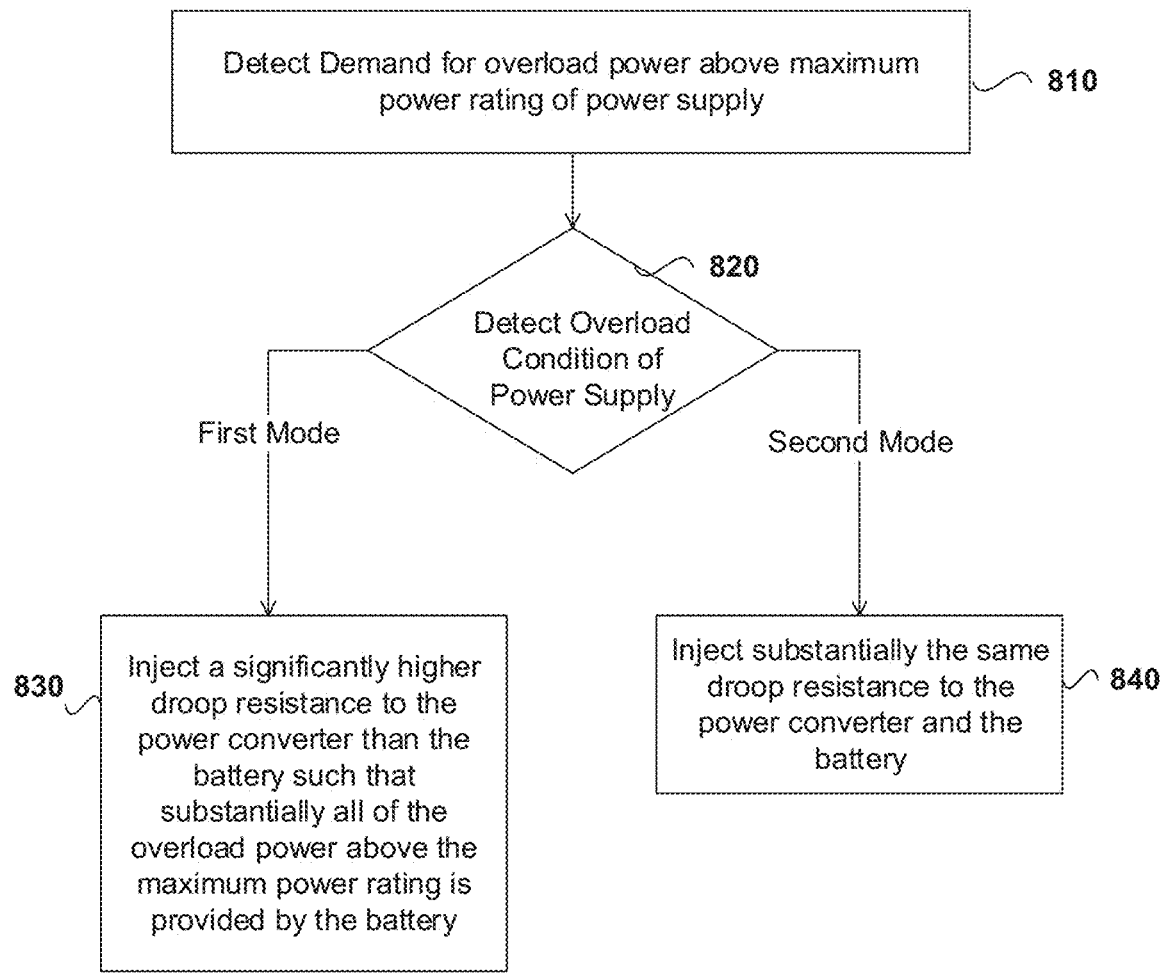
FIG. 8 is a flow diagram showing an example method of operation of a power supply according to the present disclosure.

FIG. 8 shows a method of operation of a power supply in accordance with an example of the present disclosure.

At block 810 the power supply is set to a first mode or a second mode. This is the same as block 410 of the method of FIG. 4.

At block 820, an overload condition of the power supply is detected during operation of the power supply, while it is supplying power to a load. For example, this may be determined based on a current sensor and or a voltage sensor at the output of the power supply, or a similar sensor at an output of the power converter. The subsequent operation of the power supply depends on whether the power supply is set in the first mode or the second mode.

If the power supply is set to the first mode, then at block 830, a droop impedance is injected to an output of the power converter, for example by modifying a impedance of a droop circuit of the power converter. The injected droop impedance injected to the power converter is significantly higher than a droop impedance injected to the battery, such that substantially all of the overload power above the maximum power rating is provided by the battery.

If the power supply is set to the second mode, then at block 840, substantially the same droop impedance is injected to both the power converter and the battery. This results in the provision of overload power being shared substantially equally between the power converter and the battery. In other examples different droop impedances may be injected to the power converter and the battery to cause both the battery and power converter to provide overload power, but with a different split of provision of overload power between the battery and the power converter, such as 55/45, 60/40 or vice versa etc.

Figure 9:
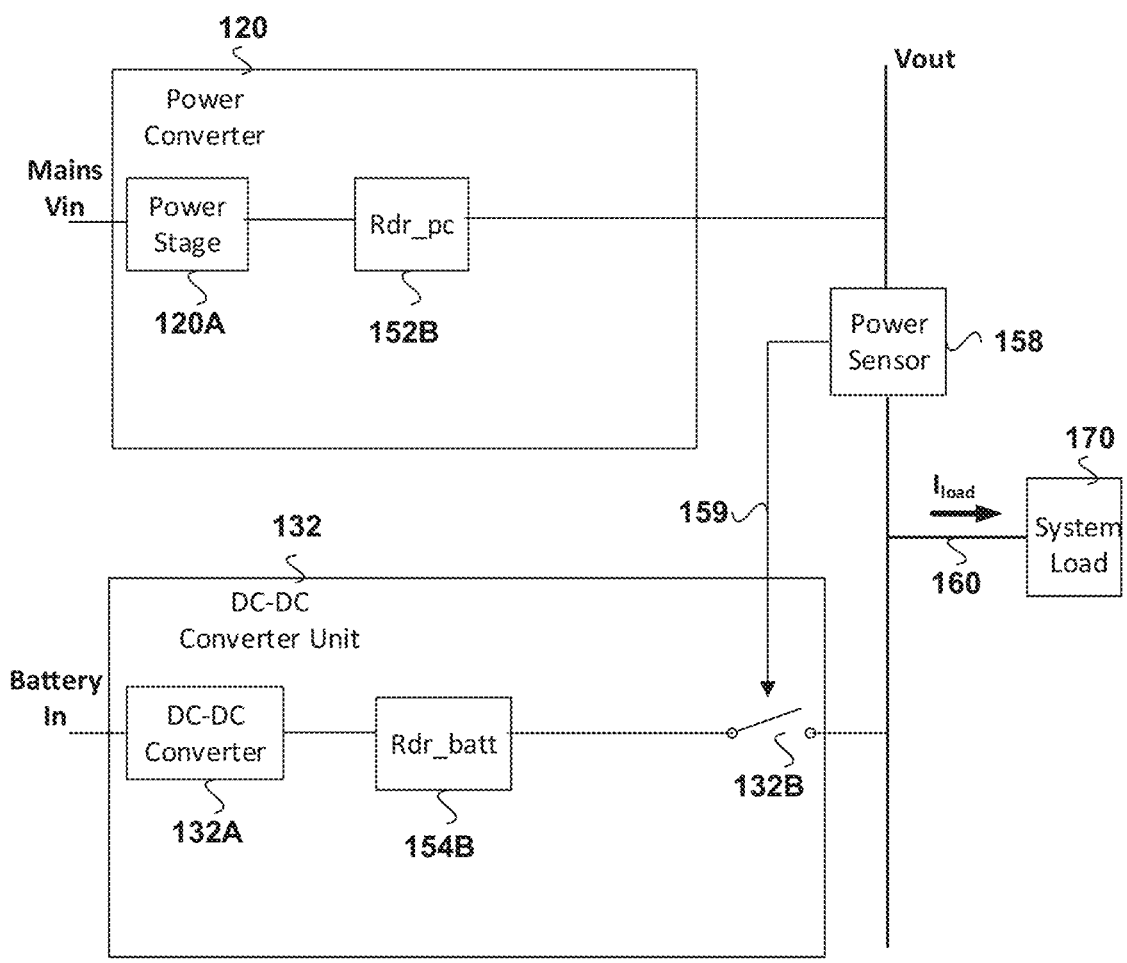
FIG. 9 is a circuit diagram showing an example power supply according to the present disclosure.

FIG. 9 shows an example notional circuit diagram showing action of a first droop circuit 152 associated with the power converter 120 and a second droop circuit 154 associated with the battery of a power supply according to an example of the present disclosure. The first droop circuit 152 is shown as an internal circuit of the power converter 120, while the second droop circuit 154 is shown as an internal circuit of a DC to DC converter 132 connected between the battery and the output 160 of the power supply.

The power converter 120 includes at least one power stage 120A that receives an AC voltage and converts it to a DC voltage. The first droop circuit is shown as an effective output impedance 152B of the power converter 120. The DC to DC converter 132 includes a DC to DC converter unit 132A and a second droop circuit, which is shown as an effective output impedance 154B of the battery. While the droop circuits are shown nominally as output impedances, they are not necessarily actual impedances. While the droop circuits may in some implementations comprise an actual impedance, such as a potential divider, in other implementations the droop circuits may act as an effective output impedance via operation of a feedback circuit to moderate output voltage.

The DC to DC converter 132 may also include a switch 132B. The switch 132B may default to off to disconnect the battery and the DC to DC converter from the output 160 of the power supply, and be turned on to connect the battery and the DC to DC converter to the output of the power supply in response to a power sensor 158 determining that a power demanded by a load 170 of the power supply is above a predetermined threshold, such as a power rating of the power converter 120. The power sensor 158, may for example comprise a current sensor and related to logic circuitry to determine when the demanded power is above the predetermined threshold. The power sensor 158 may activate the switch 132B via a control line 159.

Figure 10:
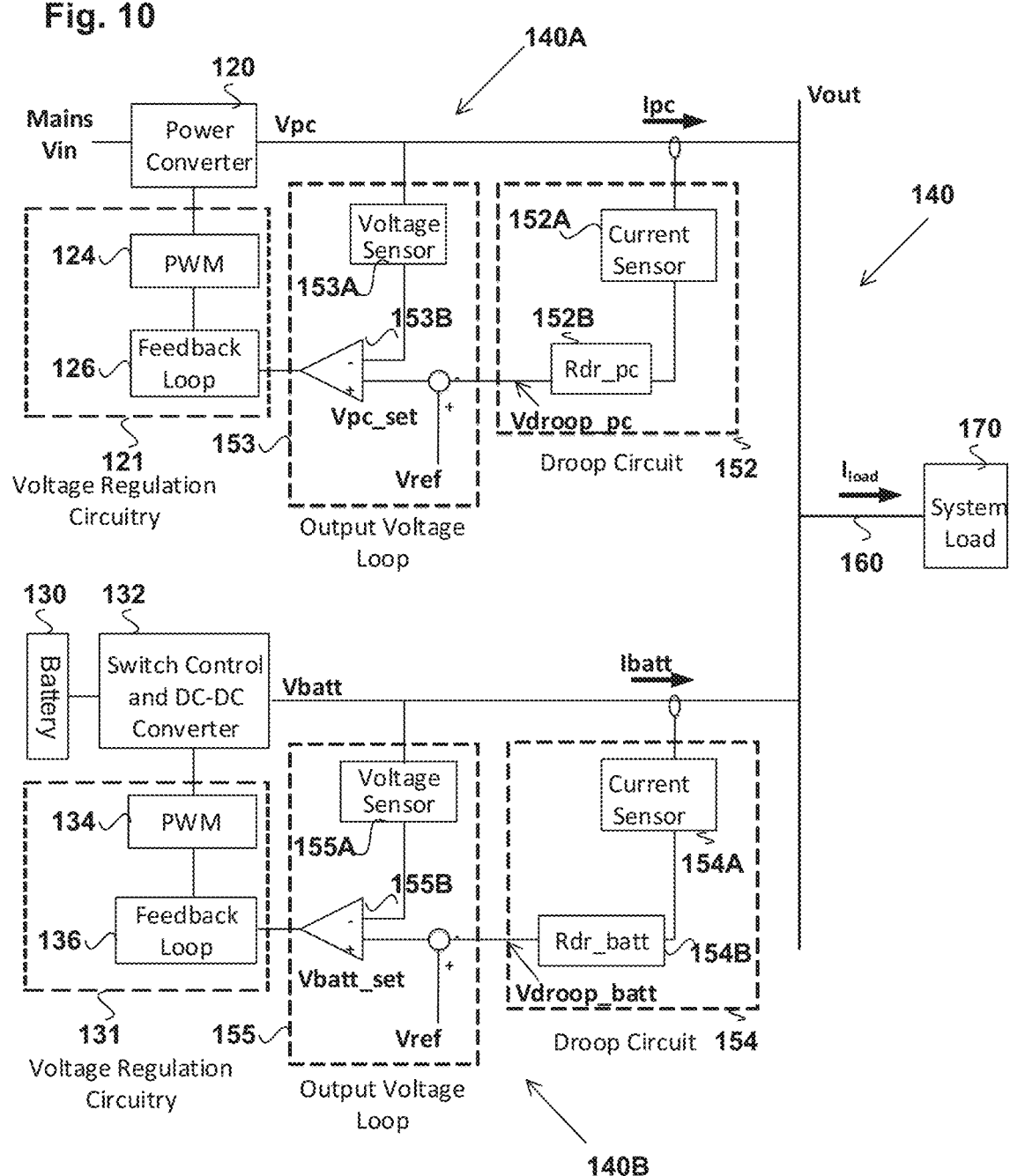
FIG. 10 is a circuit diagram of an example power supply according to the present disclosure.

FIG. 10 shows a detailed circuit diagram of an example implementation of a power supply according to the present disclosure.

The power supply includes a power converter 120 which takes input AC electrical power, from a source such as a mains outlet, and converts the AC electrical power to DC electrical power. The power converter 120 may include a transformer, rectifier, filters and other components in a number of power conversion stages. The output of the power converter 120 is connected to an output 160 of the power supply. The output of the power converter is DC having a voltage of Vpc and a current of Ipc.

The power supply further includes a battery 130 which may act as a backup power source to supply power in the event that there is a mains power failure, or failure of the power converter. A control unit 132 is connected to the output of the battery 130. This unit may include a switch to switch on and off provision of power from the battery 130 to the output of the power supply, for instance in response to detecting a power failure as noted above, or in response to detecting an overload condition of the power supply. Thus, the switch may disconnect the battery 130 from the output of the power supply when the switch is off and connect the battery with the output of the power supply when the switch is on. The unit 132 may further include a DC to DC converter to down convert, or up convert, voltage supplied by the battery 130 to an appropriate level for the power supply. The output of the unit 132 is connected to the output 160 of the power supply and has a voltage of Vbatt and a current Ibatt, when the switch of the unit 132 is on.

The output 160 of the power supply may be connected to an electrical load 170, such as a computing device or other equipment which uses electrical power. The output 160 of the power supply supplies DC electrical power to the load 170. As can be seen from the circuit diagram, the output 160 of the power supply is connected to both the output of the power converter 120 and the output of the unit 132 and may draw electrical current from one, or both of, the power converter 120 and the battery 130, depending on the circumstances. The output 160 of the power supply is a voltage Vout and a current Iload. The output current Iload is the sum of the current output by the power converter Ipc and the current output by the unit 132 Ibatt.

The power supply further includes a logic circuit 140 connected between the battery and the power converter outputs and the output 160 of the power supply. The logic circuit 140, in this example, includes a first part 140A which controls power output of the power converter 120 and a second part 140B which controls power output of the unit 132 associated with the battery.

The first part of the logic circuit 140A includes a droop circuit 152 and an output voltage loop 153, which is connected to the power converter 120 via voltage regulation circuitry 121 including a feedback loop 126 and a pulse width modulator (PWM) 124. The droop circuit 152 samples the current Ipc output from the power converter at a current sensor 152A and sends a current based on the sampled current through a first droop impedance Rdr_pc. This results in a voltage Vdroop_pc being output from the droop circuit 152 to the output voltage loop 153. For instance, if the current Ipc is passed through the droop impedance Rdr_pc, then the voltage Vdroop_pc will be less than the voltage output from the power converter Vpc, as some of the voltage Vpc will have been consumed in passing through the droop impedance Rdr_pc. The value of the droop impedance Rdr_pc is determined by the settings and configuration of the power supply and may vary depending on the mode of the power supply (e.g. battery mode or performance mode).

The output voltage loop 153 includes a voltage sensor 153A, which monitors a voltage Vpc output by the power converter and outputs a corresponding voltage to a first input of a differential amplifier 153B. The voltage Vdroop_pc from the droop circuit is combined with a reference voltage Vref in the output voltage loop 153 and then passed to a second input of the differential amplifier 153B. The differential amplifier 153B outputs a control voltage Vpc_set based on the difference between the two inputs of the differential amplifier. The voltage Vpc_set acts as a control signal to regulate the power converter 120. The voltage Vpc_set is sent through the feedback loop 126 and acts as an input to the PWM 124. Based on the voltage from the feedback loop 126, the PWM 124 modulates the power converter 120, for example by quickly switching the power converter 120 on and off so as to control the average voltage and current output by the power converter over a period of time. In this way the PWM 124 acts as a regulator of the power converter 120. The first droop impedance Rdr_pc thus controls, via the feedback loop, the voltage and current output by the power converter 120.

The second part of the logic circuit 140B is similar to the first part 140A. The part 140B includes a second droop circuit 154 and a second output voltage loop 155 which is connected to the unit 132 via voltage regulation circuitry 131 including a feedback loop 136 and a pulse width modulator (PWM) 134. The second part of the logic circuit 140B thus controls the voltage Vbatt and current Ibatt output by the unit 132 associated with the battery 130. The second droop circuit 154 includes a current sensor 154A and a second droop impedance 154B, while the second output voltage loop 155 includes a voltage sensor 155A and a differential amplifier 155B. The components of the second part 140B of the logic circuit are connected to each other and operate in a similar manner to parts having the same, or similar, names in the first part 140A of the logic circuit. Thus way the PWM 134 acts as a regulator of the battery, in that it regulates power provided by the unit 132 to the power supply output 160. Thus, via the feedback loop 136, the level of the second droop impedance 154B controls the output current Ibatt and voltage Vbatt supplied by the unit 132 to the output of the power supply 160.

Moreover, the relative values of the first droop impedance 152B and the second droop impedance 154B influence the respective proportions of overload power supplied by the power converter 120 and the battery 130. In one example, a switch of the unit 132 is off, such that all power output by the power supply is supplied by the power converter 120. In another example, in response to detecting an overload of the power supply, for example from the current and/or voltage sensors 152A, 153A, the switch of the unit 132 may be switched on so that the battery 130 can contribute to the provision of overload power. In the case that the power supply is in battery mode, the second droop impedance may be zero or very much lower than the first droop impedance, in which case substantially all of the overload power is supplied by the battery 130. However, in the case that the power supply is in performance mode, the first and second droop impedances may be substantially equal such that the provision of overload power is split substantially evenly between the power converter 130 and the battery 120. In other examples, the performance mode may be configured, by appropriate selection of the first and second droop impedances, such that both the power converter 120 and the battery 130 contribute to the provision of overload power, but the split is other than 50/50.

While the first droop circuit 152, output voltage loop 153 and voltage regulation circuit 121 are shown as external to the power converter 120 for clarity, any or all of these circuits may be included in a control circuit internal to the power converter 120. Likewise, while the second droop circuit 154, output voltage loop 155 and voltage regulation circuit 131 are shown as external to the DC to DC converter 132 for clarity, any or all of these circuits may be included in a control circuit internal to the DC to DC converter 132.

All of the features disclosed in this specification (including any accompanying claims, abstract and drawings), and/or all of the blocks of any method so disclosed, may be combined in any combination, except combinations where at least some of such features and/or blocks are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A power supply comprising:
   a power converter to convert alternating current (AC) to direct current (DC) and provide DC to an output of the power supply;
   a battery to provide DC to the output of the power supply in the event that no power is available from the power converter;
   a logic circuit to cause both the battery and the power converter to provide DC to the output of the power supply in response to detecting a demand for power over a predetermined threshold that corresponds to a maximum power rating of the power supply;
   wherein:
      the logic circuit includes a droop circuit to control a division of output of power between the power converter and the battery,
      the power supply has a first mode in which, in response to a demand for power above the maximum power rating, an overload power that is the difference between the demand for power and the maximum power is supplied by the battery, and
      the power supply is switchable between the first mode and a second mode, and wherein, in the second mode, in response to the demand for power above the maximum power rating, the logic circuit is to:
         cause the overload power to be supplied by both the power converter and the battery; and
         cause an effective output impedance of the battery and an effective output impedance the power converter to be substantially the same.

2. The power supply of claim 1 wherein the logic circuit includes a first droop circuit and a second droop circuit; the first droop circuit is connected between an output of the power converter and the output of the power supply and the second droop circuit is connected between an output of the battery and the output of the power supply.

3. The power supply of claim 1, wherein in the first mode, in response to detecting a demand for power above the maximum power rating, the logic circuit is to adjust an effective output impedance of the power converter to be significantly higher than an effective output impedance of the battery such that substantially all of the overload power above the maximum power rating is provided by the battery.

4. The power supply of claim 2, wherein the first droop circuit is embedded in a control circuit of the power converter.

5. The power supply of claim 1, further comprising:
   a switch that sets the power supply to the first mode or the second mode.

6. The power supply of claim 1, wherein the maximum power rating of the power supply is 800 Watts (W).

7. The power supply of claim 2, wherein the second droop circuit is integrated into a DC-DC converter unit of the battery.

8. The power supply of claim 1, wherein the power converter includes a transformer, a rectifier, and a filter.

9. The power supply of claim 1, further comprising:
   a control panel whereby the power supply is set to the first mode or the second mode.

* * * * *